Feb. 24, 1953
C. W. HANSEN ET AL
2,629,832
VOLTAGE MEASUREMENT
Filed June 28, 1950
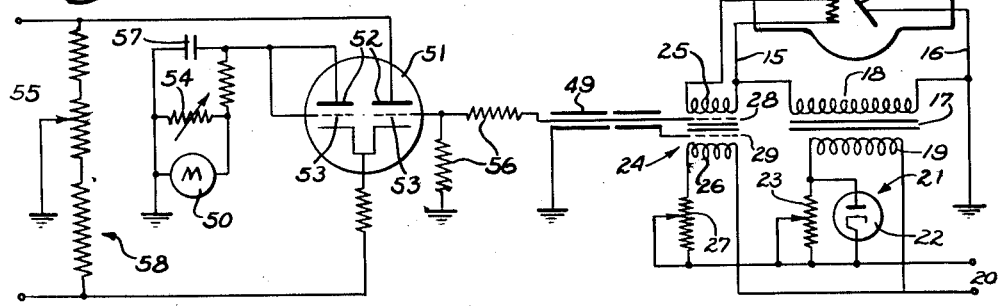
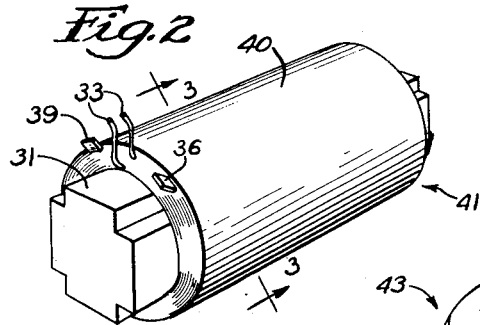
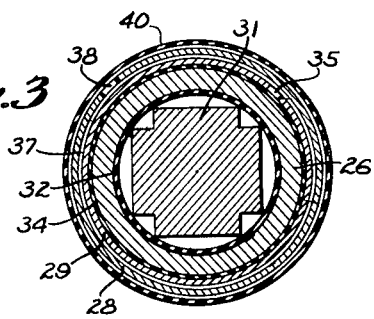
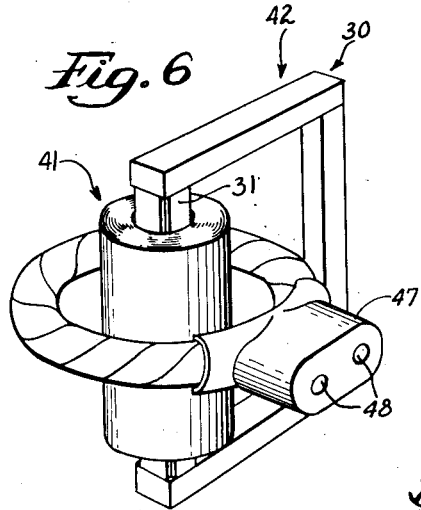
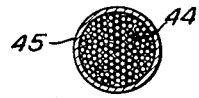
INVENTORS:
Carl W. Hansen
Richard B. Gustafson
By: Spencer, Johnston, Cook + Root
Attys.

Patented Feb. 24, 1953

2,629,832

UNITED STATES PATENT OFFICE 2,629,832

VOLTAGE MEASUREMENT

Carl Woodrow Hansen and Richard Boughton Gustafson, Milwaukee, Wis., assignors to General Electric Company, a corporation of New York Application June 28, 1950, Serial No. 170,888

9 Claims. (Cl. 250—102)

1

The present invention relates in general to the measurement of electrical values, and has more particular reference to improved means for and method of measuring electrical potential, more especially the high voltage potential applied between anode and cathode for the operation of an electron flow device, such as an X-ray tube.

The anode-cathode X-ray tube operating voltage is usually supplied to the tube through a step-up transformer; and is commonly measured in terms of the voltage across the primary circuit of the supply transformer, by means of a meter and calibration charts, or by a compensated meter. In some installations, and particularly where the tube is designed for operation at high anode-cathode potential values, especially where the supply system includes an inverse voltage reducer, it is exceedingly difficult to suitably compensate the meter to read voltage in terms of KVP accurately under all load conditions, since the shape of calibration curves, or meter response, varies considerably with the variable conditions under which the device may be operated.

An important object of the present invention is to provide new and improved means for and method of measuring the anode-cathode operating voltage of an electron flow device which will give substantially uniform results regardless of the operating load applied on the tube.

Another important object is to provide for measuring anode-cathode voltage in an X-ray tube in terms of the potential appearing between adjacently disposed capacitor plates in electrostatic relationship with an element held at the anode-cathode voltage to be measured; a further object being to incorporate said plates in a current transformer connected to energize the cathode of the X-ray tube, whereby said plates may bear an electrostatic relationship with the secondary winding of said cathode energizing transformer, which winding is at a potential with respect to ground equal to the potential prevailing between the cathode and its cooperating grounded anode, to the end that the voltage between said plates may bear, at all times, a predetermined relationship with the voltage of the tube cathode with respect to ground.

Another important object is to provide a suitable translation system for operating a meter, at all times, in response to the voltage appearing across a pair of capacitor plates incorporated in a current transformer employed in energizing the cathode of an electron flow device, whereby accurately to measure, at all times, in terms of KVP, the anode-cathode voltage of the flow device.

2

Another important object is to provide a novel cathode energizing transformer having incorporated therein a pair of capacitor plates for the uses and purposes above set forth.

The foregoing and numerous other important objects, advantages, and inherent functions of the invention will become apparent as the same is more fully understood from the following description, which, taken in connection with the accompanying drawing, discloses a preferred embodiment of the invention.

Referring to the drawing:

Fig. 1 is a diagrammatic representation of an electron flow device in the form of an X-ray tube, and means embodying the present invention for measuring the anode-cathode voltage applied for operating the electron flow device;

Fig. 2 is a perspective view of a part of a cathode energizing transformer embodying the present invention;

Fig. 3 is a sectional view taken substantially along the line 3—3 in Fig. 2;

Fig. 4 is a perspective view of another part of the cathode energizing transformer;

Fig. 5 is a sectional view taken substantially along the line 5—5 in Fig. 4; and Fig. 6 is a perspective view of the cathode energizing transformer.

To illustrate the invention, the drawings show an electron flow device 11, comprising an X-ray tube having an anode 12 and a cathode 13 enclosed in a sealed envelope 14.

It will be understood that electron flow devices operate in response to electron flow between the cathode and the anode. To this end, the cathode is adapted to emit electrons which are caused to travel toward, and to impinge upon, the anode under the driving urge of electrical potential of suitable polarity applied between the anode and cathode.

To this end, the cathode, which usually comprises a filament adapted to be electrically energized to promote electron emission from the cathode, is provided with conductors 15 extending outwardly of the envelope 14 for connection with a suitable source of cathode energizing power. The anode also may be connected with a conductor 16 extending outwardly of the envelope, so that an operating voltage may be applied between the anode and the cathode for electron driving purposes by connecting the conductor 16 and one of the conductors 15 with a suitable power source outwardly of the envelope. To this end, the operating voltage may be applied between anode and cathode through a transformer 17, the secondary or high voltage winding 18 of which is connected between the conductor 16 and one of the conductors 15, the primary winding 19 of the transformer being energized from a suitable source of alternating current power 20. Where the flow device 11 is thus operated as a self-rectifying unit by the application of alternating potential between the anode and cathode, it is desirable to include an inverse voltage suppressor 21 in the primary circuit of the transformer 17, in the manner and for the purposes set forth in U. S. Patent No. 2,089,358 of August 10, 1937. As shown, the inverse suppressor may comprise an electron flow valve, in the form of a diode rectifier 22 connected in parallel relationship with an adjustable resistor 23 in the primary circuit of the transformer 17.

The cathode 13 may also be energized from the power source 20 through a suitable current transformer 24, the secondary winding 25 of which is connected with the cathode conductors 15, the primary winding 26 of said transformer being connected with the power source, as through an adjustable resistor 27; and the present invention contemplates measurement of the operating voltage that is supplied between the anode and cathode through the transformer 17.

To this end, the conductor 16 is grounded, and the cathode energizing transformer 24 is provided with a pair of preferably copper plates 28 and 29, insulated the one from the other and both from the windings of the transformer, said plates being in electrostatic relationship, the one with respect to the other and both with respect to the other and both with respect to the transformer windings. One of these plates, such as the plate 29, may be connected to ground. The secondary winding 25 of the transformer, being at a potential with respect to ground equal to the potential to be measured between the cathode and the grounded anode of the device 11, may function, in cooperation with the plates 28 and 29, as the high voltage electrode of a capacitance divider. The plate 28 serves as the intermediate electrode of the divider, the plate 29 serving as a ground electrode in the combination. In such a divider, the potential between the intermediate and ground electrodes 28 and 29 is proportional to the voltage between the winding 25 and the grounded electrode 29. Since the high voltage winding 25 is at a potential with respect to ground equal to the potential between the cathode 13 and the grounded anode 12, the potential between the plates 28 and 29 will at all times be a proportional function of the anode-cathode potential to be determined.

As shown more particularly in Figs. 2–6, the transformer 24 comprises a frame or core 30, forming the magnetic circuit of the transformer and having a portion or arm 31 upon which the primary winding 26 of the transformer is assembled. To this end, the arm 31 may be provided with a layer 32 of insulating material, upon which wire conductor means forming the winding 26 may be applied in conventional fashion presenting the opposite ends of the coil 26 as at 33, for connection with the power source 20. A layer of insulation 34 may then be applied upon the primary transformer winding 26, and the plate 29, bent preferably to cylindrical form, may be assembled in position snugly enclosing the layer of insulation 34. The opposite ends of the plate 29 are spaced apart, as at 35, to avoid a shorted turn in the transformer, and the plate is provided with an integral tab 36 projecting at an end of the assembly for the purpose of making electrical connection with the plate.

A layer of insulating material 37 is applied upon the plate 29, the plate 28, in turn, being assembled around and snugly upon the insulating layer 37; and the opposite ends of the plate 28 are spaced apart, as at 38, to avoid a shorted turn in the transformer. The plate 28 also may be provided with an integral tab 39 to allow for electrical connection with the plate. An outer layer or layers of insulation 40 may be applied upon the plate 28 to complete the unitary primary winding and plate assembly 41, in form as shown in Fig. 2. The unit 41 may then be assembled with the remaining portions of the core frame to provide a unit 42 comprising the transformer core, primary winding, insulation, and the plates 28 and 29.

The secondary winding 25 of the transformer may be formed as a toric ring unit 43, comprising conductors 44 coiled to form the ring and held in position as by means of insulation 45 wrapped upon the coiled conductors, the opposite ends of the winding being brought out of the ring and fitted with connection terminals, as shown at 46, for electrical connection with the cathode 13.

In order to mount and support the unit 43 in proper relation with respect to the unit 41, the latter may be mounted in suitable frame means disposed in predetermined relationship with respect to the end of the tube 11 at which the conductors 15 emerge. In this connection, it should be understood that suitable means is also provided for mounting and supporting the tube 11 in an operative position determined by such tube supporting means, and that the assembly 42 is mounted in its support frame in fixed position with respect to the tube supporting means. In assembling the unit 42, the toric coil unit 43 will be assembled in position interlinked with the core frame 30, including the portion 31 thereof which carries the primary winding of the transformer. The ring unit 43 may also be provided a support bracket 47 forming a connection socket, having prong openings 48 opening into cavities in the socket in which connector terminals are mounted, the ends 46 of the transformer secondary winding 25 being electrically connected with such connector terminals. The bracket 47 may be secured on the toric coil unit 43, as by taping it securely in place.

Terminal prongs, electrically connected with the conductors 15, may also be mounted on a prong support fixed on the tube 11 at the end thereof at which the conductors 15 emerge. These prongs may be so spaced and positioned that when the tube 11 is fixed in its support, the unit 43 may be mounted on the tube and held in predetermined position with respect to the unit 41 by insertion of the bracket 47 upon the tube mounted cathode connection prongs.

The tube and its mountings, together with the transformers 17 and 24, and the inverse suppressor element 22, may be, and preferably are enclosed in a sealed and grounded shockproof casing or tank, the resistors 23 and 27 being accessible for adjustment outwardly of the casing. In order to determine voltages prevailing between the plates 28 and 29, the same may be connected respectively with the inner and outer conductor portions of a coaxial cable 49 extending outwardly of the tank, the outer element of which may be connected with the plate 29 and grounded on the casing or tank. The voltage between the plates 28 and 29 may then be determined by measuring the voltage between the outer end of the inner coaxial cable element and the grounded outer element thereof.

In the foregoing arrangement it will be noted that coil 25 will at all times be at a voltage with respect to ground equal to the voltage of the cathode 13 with respect to ground. The inner plate 29, also, is grounded so that the voltage of the coil 25 with respect to the plate 29 will at all times be equal to the voltage in the tube 11 between cathode and ground. The plate 28, however, will be disposed between the grounded plate and the coil 25, whereby the combination will constitute a voltage divider in which the voltage between the inner or grounded plate 29 and the intermediate plate 28 will be directly proportional to the voltage between the coil 25 or the cathode 13 and ground. Where Ca is the capacity between the ungrounded plate and the secondary winding 25 of the cathode energizing transformer; Cb is the capacity between the two plates 28 and 29, plus the capacity of the coaxial cable; and Vp is the voltage between the plates 28 and 29, the voltage to be measured may be expressed as follows:

$$V = Vp \times \frac{Ca + Cb}{Ca}$$

In order to determine the voltage Vp prevailing between the plates 28 and 29, the present invention contemplates a translation system, as shown in Fig. 1, which essentially comprises a cathode follower having a negative peak reading voltmeter 50 in its output. To this end, the system comprises a cathode follower tube 51 having a pair of plates 52 and corresponding grids 53, one of said plates and its corresponding grid being electrically tied together and connected with the meter 50 through a suitable meter energizing circuit, including an adjustable resistor 54. The other plate of the follower tube is connected with a suitable source of energizing power 55, while the remaining grid of the tube is connected with the central conductor element of the coaxial cable, and, hence, with the plate 28, through resistors 56 forming a voltage divider. The cathode follower acts as an amplifier operating at a gain slightly less than one, and has the advantage that it imparts no loading effect upon the input circuit with which the plates 28 and 29 are connected, and, hence, avoids interference with the voltages to be determined.

The tube current of the cathode follower is proportional to the voltage on its grid, so that the voltage across the cathode resistance will also be proportional to the grid voltage. The power dissipated in the cathode resistance is drawn from the power supply source 55 and in from the control signal comprising the voltage to be determined. The peak reading voltmeter 50 is made to read the negative peak by applying the signal to the cathode with the plate tied to ground through the metering circuit.

The capacitor 57 in this circuit will charge to peak voltage during the half cycle in which the tube 11 is conducting; and said capacitor 57 will discharge through the meter and its connected resistance during the alternate half cycle. The time constant of the circuit is made sufficiently long so that the capacitor 57 will discharge only slightly during the inverse half cycle, to the end that current delivered through the meter will be proportional to peak voltage. A conventional cathode follower is not suitable for use in accordance with the present invention, since the same is unable to go more than a few volts in the negative direction. It is essential to have a large voltage drop across the cathode resistance, with zero voltage between the plates 28 and 29. This is accomplished by providing bleeder resistors 58 in the power supply 55, and by providing for grounding an intermediate portion of the bleeder resistors, this ground being adjustable to provide for variation in the characteristics of the cathode follower tube.

The foregoing voltage measuring system has a very nearly linear response over the operating voltage range of X-ray tubes; and the voltage measuring response does not vary appreciably with X-ray tube loading. Accordingly, it is possible to calibrate the meter throughout its voltage range at no load, after which the meter will read in terms of true KVP between the anode and cathode of the X-ray tube 11, regardless of the loading of said tube.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A voltage measuring system for measuring the anode-cathode voltage in an electron flow device, comprising the combination, with the cathode energizing transformer of the flow device, of a pair of electrodes insulated the one from the other and from the windings of the transformer, and disposed in electrostatic relation with each other and with the cathode energizing winding of the transformer, whereby to form an electrostatic voltage divider in which the induced voltage, between said electrodes, is a proportional function of the anode-cathode voltage to be measured, when one of said electrodes and said cathode energizing winding are electrically connected respectively with the anode and cathode of the flow device, an indicating meter and signal translating means interconnecting said meter with said plates for indicating the voltage therebetween in terms of anode-cathode voltage in the flow device, said translating means comprising a cathode follower system including an electron valve having a control grid, means to energize said cathode follower system from a suitable power source and to load said meter on said valve, and means comprising a voltage divider network, connected with said control grid, and a length of coaxial cable connected with the said electrostatic plates and with said net to apply a meter actuating signal on said translating means in proportion to the induced voltage on said electrodes.

2. A voltage measuring system for measuring the anode-cathode voltage in an electron flow device, comprising the combination, with the cathode energizing transformer of the flow device, of a pair of electrodes insulated the one from the other and from the windings of the transformer, and disposed in electrostatic relation with each other and with the cathode energizing winding of the transformer, whereby to form an electrostatic voltage divider in which the induced voltage, between said electrodes, is a proportional function of the anode-cathode voltage to be measured, when one of said electrodes and said cathode energizing winding are electrically connected respectively with the anode and cathode of the flow device, an indicating meter and signal translating means interconnecting said meter with said plates for indicating the voltage therebetween, said translating means comprising a cathode follower system including an electron valve having a control grid, means to energize said cathode follower system from a suitable power source and to load the meter on said valve, and means to apply a meter actuating signal on said translating means in proportion to the induced voltage on said electrodes.

3. A voltage measuring system for measuring the anode-cathode voltage in an electron flow device, comprising the combination, with the cathode energizing transformer of the flow device, of a pair of electrodes insulated the one from the other and from the windings of the transformer, and disposed in electrostatic relation with each other and with the cathode energizing winding of the transformer, whereby to form an electrostatic voltage divider in which the induced voltage, between said electrodes, is a proportional function of the anode-cathode voltage to be measured, when one of said electrodes and said cathode energizing winding are electrically connected respectively with the anode and cathode of the flow device, an indicating meter and signal translating means interconnecting said meter with said plates for indicating the voltage therebetween, said translating means comprising an electron valve having a control grid, means to load said meter on said valve, and means to apply a meter actuating signal on said control grid in proportion to the induced voltage on said electrodes.

4. A voltage measuring system for measuring the anode-cathode voltage in an electron flow device comprising a cathode energizing transformer embodying a core, an insulated transformer coil on and linked with said core, a pair of relatively insulated sleeves of electrical conducting material disposed one within the other and forming electrostatic plates mounted on and encircling said coil, and a transformer winding element interlinked with said core in position concentrically encircling said electrostatic plates, to form therewith an electrostatic voltage divider adapted to develop, between said plates, a readily measurable voltage directly proportional to the anode-cathode voltage of the electron flow device, to the anode and cathode of which one of said plates and said transformer winding element are respectively connected.

5. A voltage measuring system for measuring the anode-cathode voltage in an electron flow device comprising a cathode energizing transformer embodying a core, an insulated transformer coil on and linked with said core, a pair of relatively insulated sleeves of electrical conducting material disposed one within the other and forming electrostatic plates mounted on and encircling said coil, and a transformer winding element, formed as a toric ring, interlinked with said core and supported in position concentrically encircling said electrostatic plates, to form therewith an electrostatic voltage divider adapted to develop, between said plates, a readily measurable voltage directly proportional to the anode-cathode voltage of the electron flow device, to the anode and cathode of which one of said plates and said transformer winding element are respectively connected.

6. A voltage measuring system for measuring the anode-cathode voltage in an electron flow device comprising a cathode energizing transformer embodying a core, an insulated transformer coil on and linked with said core, a pair of relatively insulated sleeves of electrical conducting material disposed one within the other and forming electrostatic plates mounted on and encircling said coil, and a transformer winding element, interlinked with said core and supported in position concentrically encircling said coil mounted electrostatic plates, to form therewith an electrostatic voltage divider adapted to develop, between said plates, a readily measurable voltage directly proportional to the anode-cathode voltage of the electron flow device, when the innermost of said plates and said transformer winding element are respectively connected to the anode and cathode of the flow device.

7. A voltage measuring system for measuring the anode-cathode voltage in an electron flow device comprising a cathode energizing transformer embodying a core, an insulated transformer coil on and linked with said core, a pair of relatively insulated sleeves of electrical conducting material disposed one within the other and forming electrostatic plates mounted on and encircling said coil, means to mount said coil and plates in predetermined relation with respect to the electron flow device, a transformer winding element formed as a ring interlinked with said core, and mounting means for supporting said ring on the electron flow device in position concentrically encircling said coil mounted electrostatic plates, to form therewith an electrostatic voltage divider adapted to develop, between said plates, a readily measurable voltage directly proportional to the anode-cathode voltage of the electron flow device, when one of said plates and said transformer winding element are respectively connected to the anode and cathode of the flow device, said mounting means comprising a plug-in connector on said ring for connection with a cooperating connector on the flow device in position to electrically connect said winding element with the cathode leads of the flow device and to support the so connected ring on the flow device.

8. A voltage measuring system for measuring the anode-cathode voltage in an electron flow device comprising a cathode energizing transformer embodying a core, an insulated transformer coil on said core, a pair of relatively insulated sleeves of electrical conducting material disposed one within the other and forming electrostatic plates mounted on and encircling said coil, to thereby form an assembly unit, frame means for securing said assembly unit in predetermined relation with respect to the electron flow device, a transformer winding element formed as a ring interlinked with said core, and mounting means for supporting said ring on said flow device in position concentrically encircling said coil mounted electrostatic plates, to form therewith an electrostatic voltage divider adapted to develop, between said plates, a readily measurable voltage directly proportional to the anode-cathode voltage of the flow device, when one of said plates and said transformer winding element are respectively connected to the anode and cathode of said flow device, said mounting means comprising a plug-in connector on said ring for electrically connecting said winding element with the cathode leads of the flow device.

9. A voltage measuring system for measuring the anode-cathode voltage in an X-ray tube comprising a cathode energizing transformer embodying a core, an insulated transformer coil on said core, a pair of relatively insulated sleeves of electrical conducting material disposed one within the other and forming electrostatic plates mounted on and encircling said coil, to thereby form an assembly unit, frame means for securing said assembly unit in predetermined relation with respect to the X-ray tube, a transformer winding element formed as a ring interlinked with said core, and mounting means for supporting said ring on said X-ray tube in position concentrically encircling said coil mounted electrostatic plates, to form therewith an electrostatic voltage divider adapted to develop, between said plates, a readily measurable voltage directly proportional to the anode-cathode voltage of the X-ray tube, when one of said plates and said transformer winding element are respectively connected to the anode and cathode of said X-ray tube, said mounting means comprising a plug-in connector on said ring for electrically connecting said winding element with the cathode leads of the X-ray tube.

CARL WOODROW HANSEN.
RICHARD BOUGHTON GUSTAFSON.

REFERENCES CITED

The following references are of record in the file of this patent:

UNITED STATES PATENTS

| Number | Name | Date |
|---|---|---|
| 1,684,065 | Miner | Sept. 11, 1928 |
| 2,098,275 | Cassen | Nov. 9, 1937 |
| 2,170,048 | Dunning et al. | Aug. 22, 1939 |
| 2,503,075 | Smith | Apr. 4, 1950 |
| 2,504,647 | Camilli | Apr. 18, 1950 |
| 2,548,210 | Franks | Apr. 10, 1951 |